June 28, 1938.  H. GORA  2,122,204

JAR RING LATHE

Filed Feb. 2, 1937  6 Sheets-Sheet 1

Inventor
Henry Gora
By Cameron, Kerkam & Sutton
Attorneys

June 28, 1938.  H. GORA  2,122,204
JAR RING LATHE
Filed Feb. 2, 1937  6 Sheets-Sheet 2
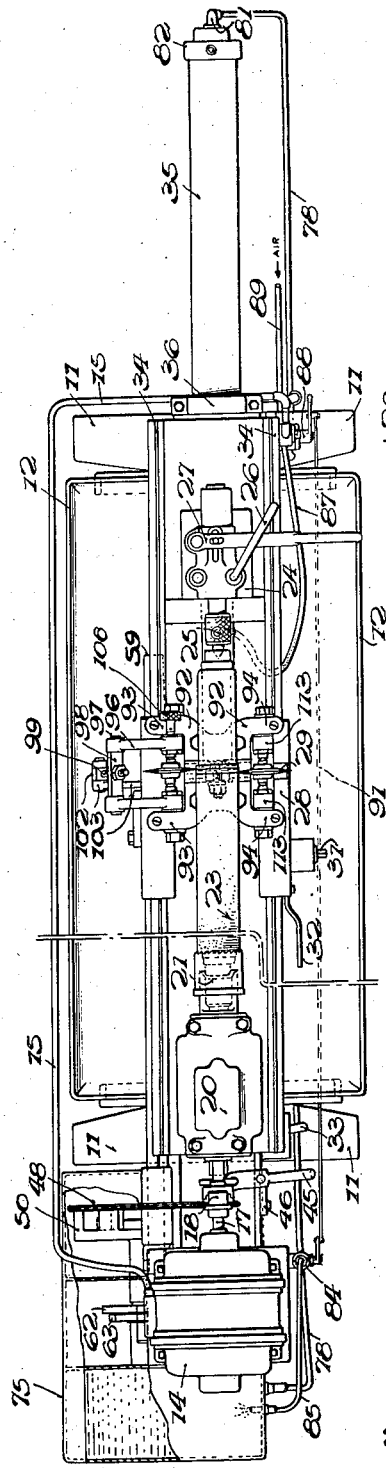
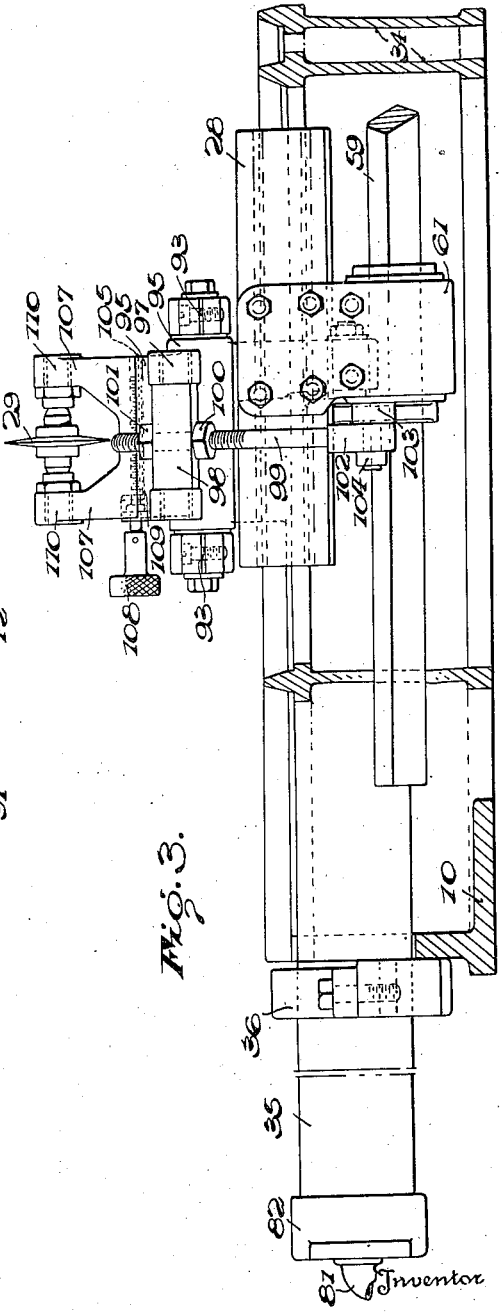
Inventor
Henry Gora
By Cameron, Kerkam + Sutton
Attorneys June 28, 1938. H. GORA 2,122,204
JAR RING LATHE
Filed Feb. 2, 1937 6 Sheets-Sheet 4
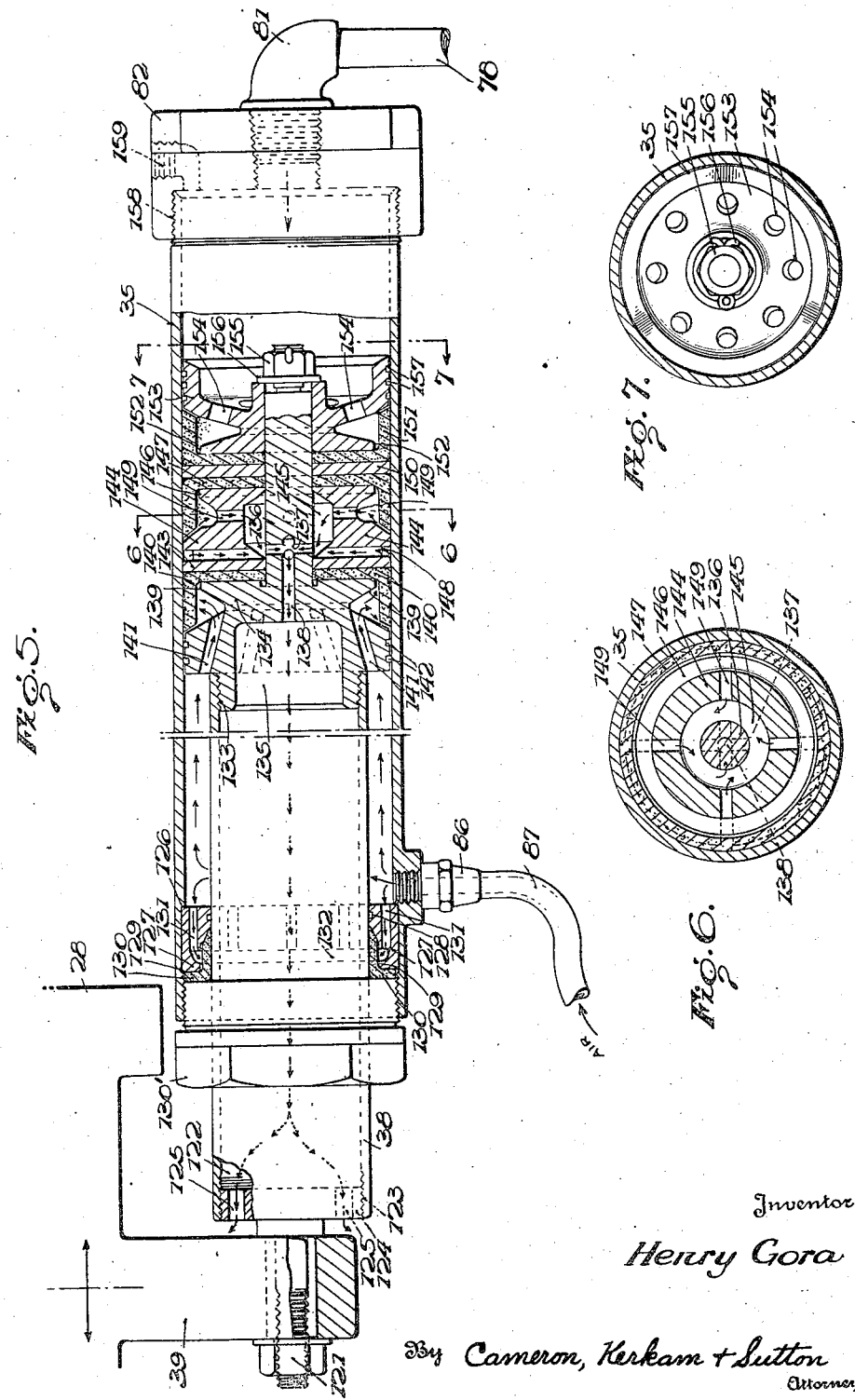
Inventor
Henry Gora
By Cameron, Kerkam & Sutton
Attorneys June 28, 1938.  H. GORA  2,122,204

JAR RING LATHE

Filed Feb. 2, 1937  6 Sheets-Sheet 5

Inventor
Henry Gora
By Cameron, Kerkam & Sutton
Attorneys

June 28, 1938.   H. GORA   2,122,204

JAR RING LATHE

Filed Feb. 2, 1937   6 Sheets-Sheet 6

Inventor.

Henry Gora

By Cameron, Kerkam & Sutton

Attorneys

Patented June 28, 1938

2,122,204

UNITED STATES PATENT OFFICE 2,122,204

JAR RING LATHE

Henry Gora, Bridgeport, Conn., assignor to Jenkins Bros., New York, N. Y., a corporation of New Jersey Application February 2, 1937, Serial No. 123,671

20 Claims. (Cl. 164—69)

This invention relates to lathes and more particularly to means for indexing carriages of lathes. More particularly still this invention relates to hydraulic means for indexing the carriage of a jar ring lathe to register the cutting knives located on the carriage to cut a uniform cut from the material carried between the centers of the lathe on a mandrel. More particularly still this invention relates to improvements in lathes of the type described in my prior United States Patent Nos. 1,864,903, 1,950,920 and 1,957,882.

Heretofore mechanical means have been employed for indexing carriages of lathes. As these mechanical means utilized many moving parts considerable trouble was had with wear of these moving parts resulting in faulty indexing of the carriage of the lathe with consequent variations in the cut made by the lathe. Since accuracy of cut particularly with reference to gauge or thickness is essential it follows that much time is lost on repairs to these mechanical indexing devices as well as expense incurred by the necessary repairs. Lathes using mechanical indexing devices also use manual means for moving the carriage to the position for commencing the cut, a slow and laborious task. The present invention is designed to obviate the difficulties had with mechanical indexing means by providing hydraulic means for carriage indexing as well as providing pneumatic means to move the carriage to the position of initial cut.

It is accordingly an object of this invention to provide a novel hydraulic means for indexing the carriage of a lathe.

Another object of this invention is to provide a novel hydraulic means for indexing the carriage of a jar ring lathe.

Another object of this invention is to provide a novel pneumatic means working in conjunction with my novel hydraulic indexing means for moving the carriage of a lathe to its position for the initial cut.

Another object of this invention is to provide a novel pneumatic means working in conjunction with my novel hydraulic indexing means for moving the carriage of a jar ring lathe to its position for the initial cut.

Another object of this invention is to provide a novel hydraulic means for indexing the carriage of a lathe in which the index positions may be controlled by varying the amount of fluid supplied to the hydraulic indexing means.

Another object of this invention is to provide a novel means for controlling the amount of fluid supplied to my novel hydraulic indexing means by varying the stroke of a pump.

Another object of this invention is to provide a novel hydraulic indexing means for a lathe which is operated by the lathe mechanism and in timed relation therewith.

Another object of this invention is to provide a novel hydraulic indexing means for a lathe operated by a pump driven by the lathe mechanism in timed relation with the movement of the lathe cutters.

Another object of this invention is to provide a novel hydraulic indexing means for lathes in which the motion of the carriage of the lathe is controlled by a piston which is operated by a fluid supplied from a pump driven by the lathe mechanism in timed relation with the movement of the cutters of the lathe.

Another object of this invention is to provide a novel adjustable hydraulic indexing means for lathes in which the motion of the carriage of the lathe is controlled by a piston which is operated by a fluid supplied from a pump of adjustable stroke driven by the lathe mechanism in timed relation with the movement of the cutters of the lathe.

A further object of this invention is to provide a novel hydraulic indexing means for lathes in which the degree of movement of the carriage of the lathe is controlled by the amount of fluid admitted to a piston in driving relation with the carriage of the lathe by a pump driven by the lathe mechanism in timed relation with the movement of the cutters of the lathe.

A still further object of this invention is to provide a novel hydraulic indexing means for lathes in which the degree of movement of the carriage of the lathe is controlled by the length of stroke of a pump supplying fluid to a piston in driving relation with the carriage of the lathe and driven by the lathe mechanism in timed relation with the movement of the cutters of the lathe.

Another and still further object of this invention is to provide a novel hydraulic means for indexing the carriage of a lathe in which a piston in driving relation with the carriage of the lathe is supplied with fluid from a pump driven by the lathe mechanism to index the carriage of the lathe and is supplied with compressed air to return the carriage of the lathe to the position for the initial cut.

Another object of this invention is to provide a novel hydraulic and pneumatic system for indexing the carriage of a lathe and for returning the carriage of the lathe to its position for starting the cut.

Another and still further object of this invention is to provide a novel hydraulic and pneumatic system for indexing the carriage of a lathe and for returning the carriage of the lathe to its position for the initial cut controlled by a single manual control.

Another and still further object of this invention is to provide a novel hydraulic and pneumatic cylinder and piston for use in a hydraulic and pneumatic system for indexing the carriage of a lathe and for returning it to its position for starting the cut in which fluid is admitted to one side of the piston to index the carriage of the lathe and compressed air is admitted to the other side of the piston to return the carriage of the lathe to its position for commencing the cut.

Another object of this invention is to provide a novel hydraulic and pneumatic cylinder and piston for driving the carriage of a lathe to index the carriage of the lathe and to return the carriage of the lathe to its position for the initial cut in which a fluid under pressure is admitted to one side of the piston and compressed air is admitted to the other without leakage of the air into the fluid or of the fluid into the air.

Another and still further object of this invention is to provide a novel hydraulic and pneumatic system for indexing the carriage of a lathe by driving a piston engaging the carriage of the lathe by a fluid under pressure and for returning the carriage of the lathe to its position for the initial cut by driving the piston by compressed air in which the fluid is returned to a reservoir by the piston when the piston is driven by the compressed air.

Other and further objects of this invention will appear as the description of the invention proceeds.

While the embodiment of my invention disclosed in the accompanying drawings, to be hereafter described, shows my invention as applied to a jar ring lathe, it is expressly to be understood that the disclosure of my invention as applied to a jar ring lathe in no way limits the scope of my invention. Reference should be had to the appended claims to determine the scope of the present invention.

In the accompanying drawings:

Fig. 2 is a view of the embodiment of Fig. 1 as seen from the top showing in more detail the positioning of the lathe carriage on the lathe bed and the rocking bar that actuates the cutters;

Fig. 3 is a view of a part of the embodiment of the invention shown in Fig. 1 as seen from the rear in Fig. 1 showing the positioning of the carriage on the lathe bed with reference to the rocking bar and cutter actuating mechanism;

Fig. 5 is an enlarged cross sectional elevation of the embodiment of my novel hydraulic and pneumatic cylinder and piston as shown in Fig. 1 showing in detail the cylinder and piston construction and the method used to effect the driving relation between the piston and the lathe carriage;

Fig. 6 is a cross sectional view of the hydraulic and pneumatic cylinder and piston shown in Fig. 5 taken on the line 6—6;

Fig. 7 is a cross sectional view of the hydraulic and pneumatic cylinder and piston shown in Fig. 5 taken on the line 7—7;

Figure 1:
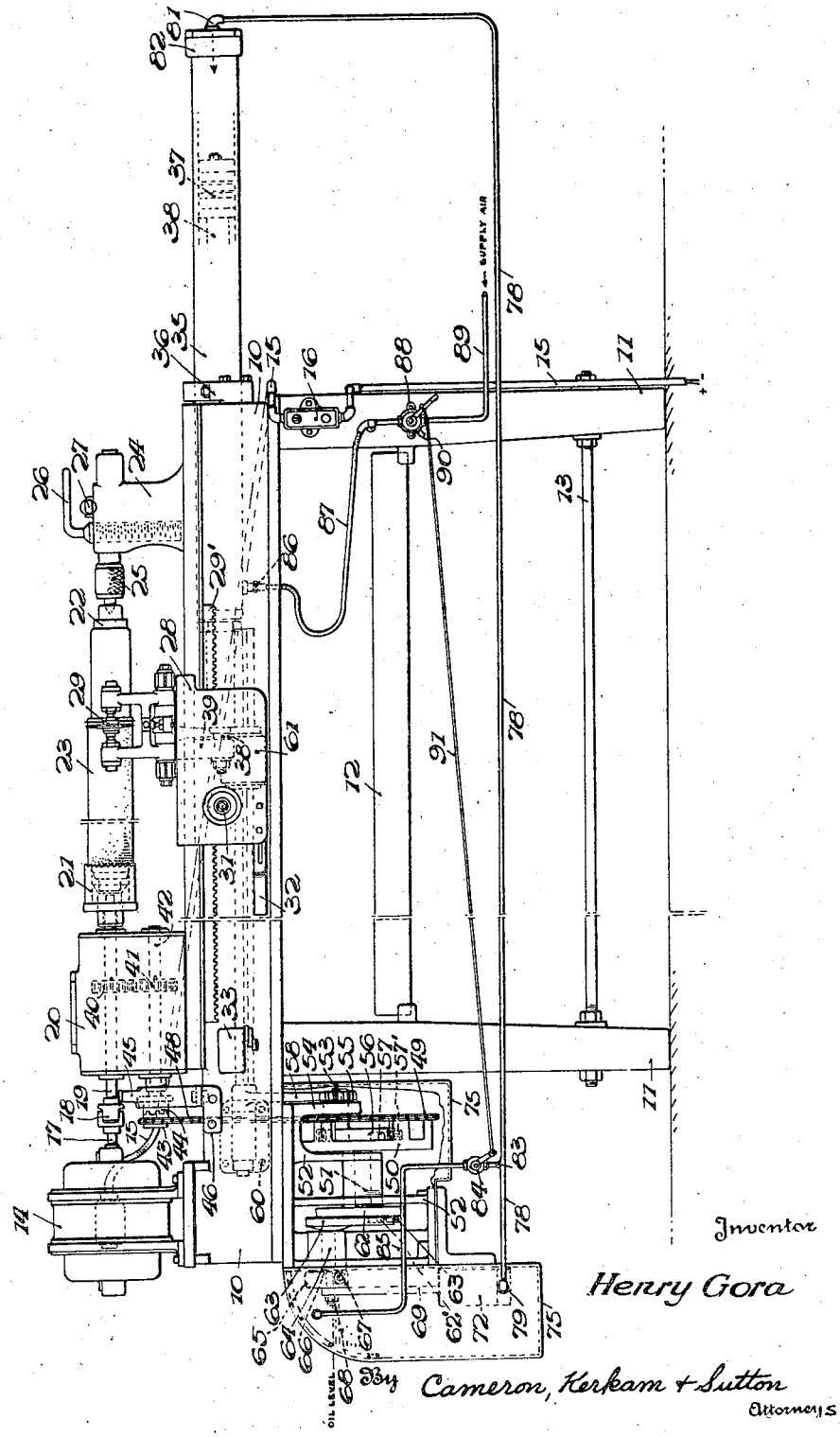
Fig. 1 is an elevation of one embodiment of my novel hydraulic and pneumatic indexing means as applied to a jar ring lathe.
Figure 4:
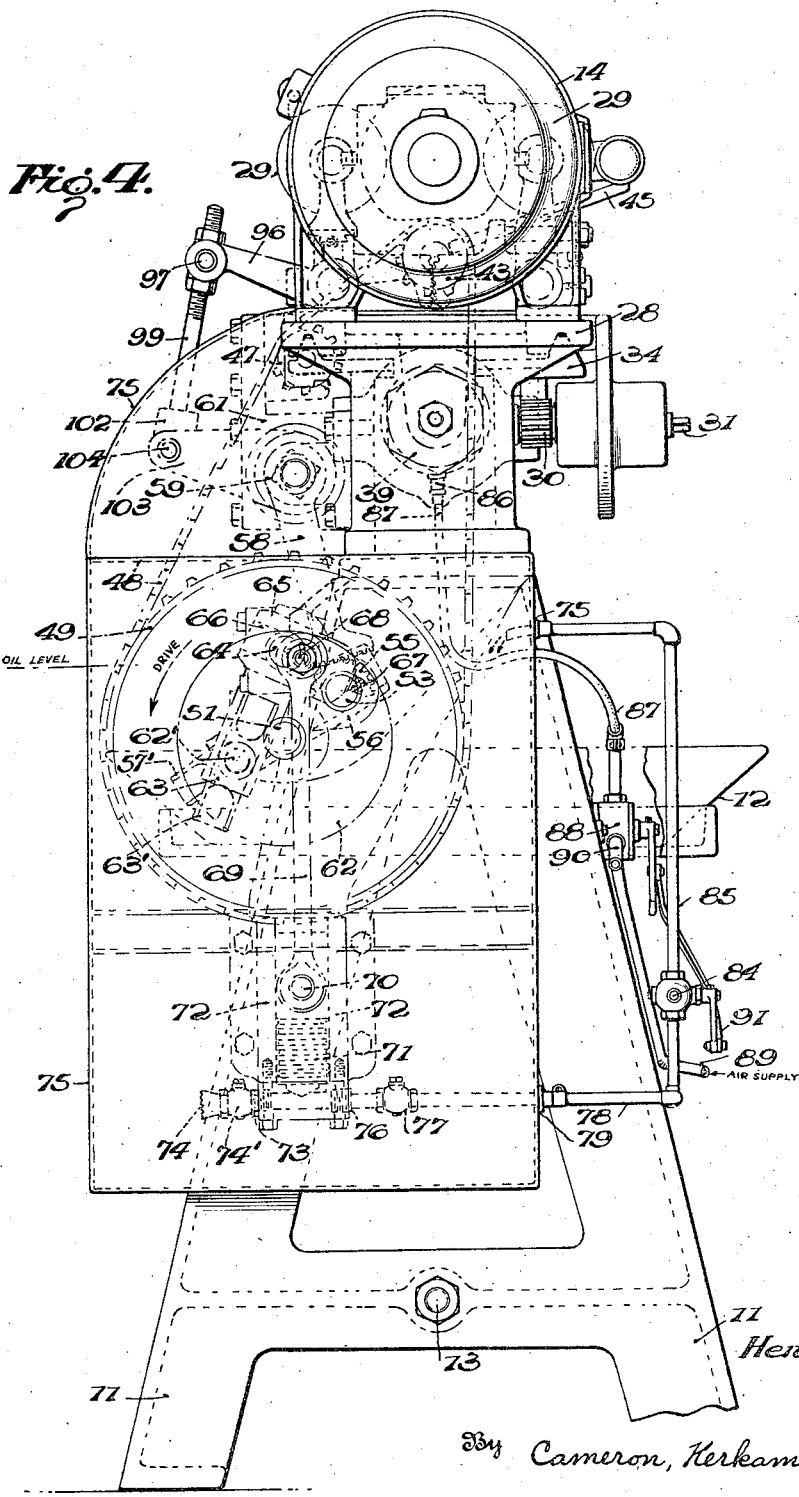
Fig. 4 is an end view of the embodiment of the present invention shown in Fig. 1 on an enlarged scale as seen from the head stock end.
Figure 10:
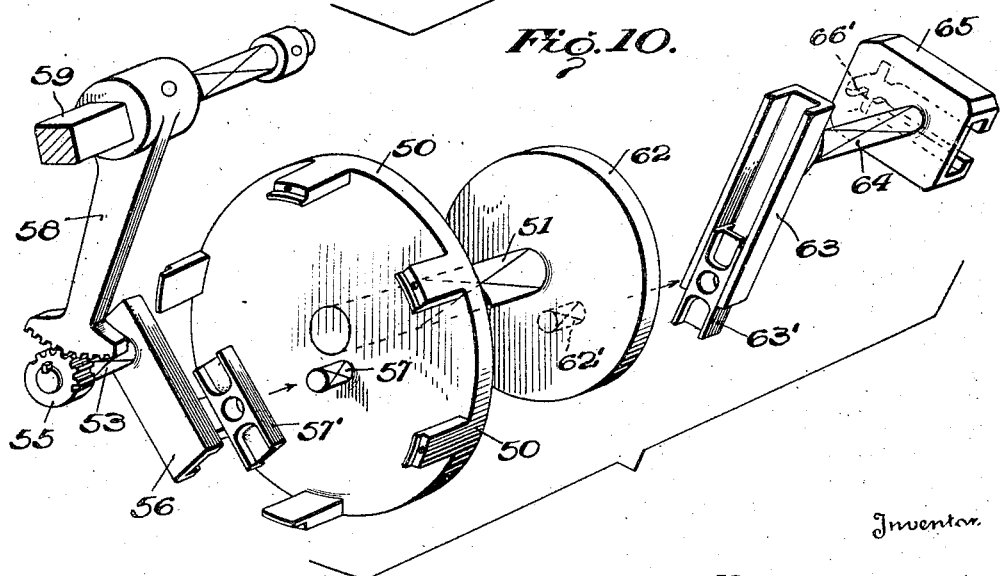
Fig. 10 is a perspective exploded view of a portion of the pump and rocker arm actuating mechanism as shown in Fig. 9.

In the several figures in which like reference characters indicate like parts and more particularly with reference to Figs. 1 and 4, 10 indicates any standard lathe bed of any desired size and construction supported on legs 11 which carry a scrap and shavings tray 12 of any desired size and construction and which are braced by a tie rod 13. Suitably mounted on one end of lathe bed 10 is an electric motor 14 of any suitable design and horse power supplied with current from any suitable source of supply through an electrical conduit 15 and controlled by any suitable electric switch 16 connected into conduit 15. Electric motor 14 drives through shaft 17 and flexible joint 18 to shaft 19 of gear box 20 which is suitably mounted on lathe bed 10. Shaft 19 of gear box 20 passes through gear box 20 and terminates in a driving head 21 designed to hold and rotate a mandrel 22 upon which is mounted the material 23 to be cut. Mounted upon the opposite end of lathe bed 10 is tail stock 24 designed to engage mandrel 22 and of any desired construction here shown as having a live center 25 which is clamped in position by clamp 26 while work is being cut and which is slid into and out of engagement with mandrel 22 when clamp 26 is released by a spring and lever connection 27.

Mounted between gear box 20 and tail stock 24 and designed to slidably engage lathe bed 10 is lathe carriage 28 upon which are mounted rotary cutters 29. Mounted upon lathe bed 10 and under carriage 28 is toothed rack 29'. Carried by carriage 28 is gear 30 (Fig. 4) which engages rack 29' and provides a means for manually indexing carriage 28 if desired through boss 31 on the shaft of gear 30 designed to take a crank or other suitable rotating means. Also carried by carriage 28 is finger 32 of suitable length and adjustable in position designed to engage switch 33 mounted on lathe bed 10 to break the electric circuit to motor 14 to stop the operation of the lathe when the end of the cut is reached.

Carried between rails 34 (Figs. 3, 4 and 8) of lathe bed 10 is hydraulic and pneumatic cylinder 35 suitably secured to lathe bed 10 as by the collar 36. Mounted within cylinder 35 is piston 37 having a suitable piston rod 38 secured thereto and extending outward through the inner end of cylinder 35 and secured in any suitable way to a depending lug 39 secured to carriage 28.

Carried by shaft 19 in gear box 20 is gear 40 designed to engage and rotate gear 41 secured to shaft 42 which takes bearing in the walls of gear box 20 and is spaced apart from and parallel to shaft 19. Mounted on one end of shaft 42 and free to rotate thereon is gear member 43 designed to form a clutching engagement with clutch member 44 which slidingly engages shaft 42. Clutch member 44 is moved into and out of engagement with gear 43 by clutch actuating lever 45 pivotally engaging clutch lever support 46 secured to lathe bed 10. Engaging gear 43 and passing over an idling gear 47 (Figs. 4 and 8) is chain 48 forming a driving connection between gear 43 and a large driven gear 49 secured to a rotary disk member 50 which is secured to a shaft 51 taking bearing in a frame 52 secured to lathe bed 10. Mounted on shaft 53 taking bearing in a projection 54 of frame 52 is segment gear 55 (Figs. 9 and 10). Secured to the inner end of shaft 53 is a female member 56 within which slides a slide member 57' which rotatably engages a pin 57 secured to disk 50. Engaging segment gear 55 in toothed engagement is rocker arm 58 secured to square shaft 59 which takes bearing at one end in bearing 60 secured to lathe bed 10 and at the opposite end slidably engages bearing 61 secured to carriage 28.

Mounted on the opposite end of shaft 51 is a disk member 62 carrying a pin 62' upon which is rotatably mounted a slide member 63'. Slidably engaging slide member 63' is female member 63 mounted for oscillation upon a shaft 64 taking bearing in a portion of frame 52. Mounted upon the opposite end of shaft 64 is female member 65 (Figs. 9 and 10) within which rides a male member 66 designed to slide within female member 65 under the action of set screw 67, set screw 67 being provided with a collar 67' designed to engage a slot 66' in female member 65. Secured to male member 66 is a pivot 68 designed to receive for rotation thereon one end of a connecting rod 69. The opposite end of connecting rod 69 rotatably engages, as at 70 (Fig. 4), a pump plunger element 71 designed to slidably engage the walls of a pump cylinder 72 closed at its bottom and secured to bracket 52. Pump cylinder 72 has an inlet 73 controlled by a check valve 74' which may have an adjacent filter 74. Completely surrounding the actuating mechanism for pump plunger 71 and rocker arm 58 and extending upward over gear 43 is a closed casing 75 forming a tank of suitable design and construction partially filled with oil to provide an oil bath for some of the moving parts of the above described pump and rocker arm actuating mechanisms as well as supplying an oil reservoir for pump plunger 71 and cylinder 72. Pump cylinder 72 has an outlet 76 to which is connected the intake of a check valve 77. From check valve 77 a pipe 78 passes through tank 75 as at 79 forming a fluid-tight seal therewith. To pipe 78 is secured at its other end an elbow 81 screwed into end closure cap 82 of cylinder 35 and opening into the interior of cylinder 35. From pipe 78 a pipe 83 leads to a valve 84. From valve 84 a pipe 85 enters tank 75 adjacent its top.

A connection 86 secured to the inner end of cylinder 35 opens into the interior of cylinder 35. Secured to connection 86 is an air line 87 leading to one side of an air valve 88. Air valve 88 is connected to any suitable source of supply of compressed air by air line 89. Air valve 88 is provided with an exhaust port 90 which allows air line 87 and cylinder 35 to exhaust air when air valve 88 shuts off the supply of air. Connected to the actuating lever of air valve 88 is a rod 91 secured at its opposite extremity to the actuating lever of valve 84 so that valve 84 may be operated with valve 88, valve 84 being so arranged that it is open when valve 88 is admitting air to cylinder 35 through air line 87.

Figure 8:
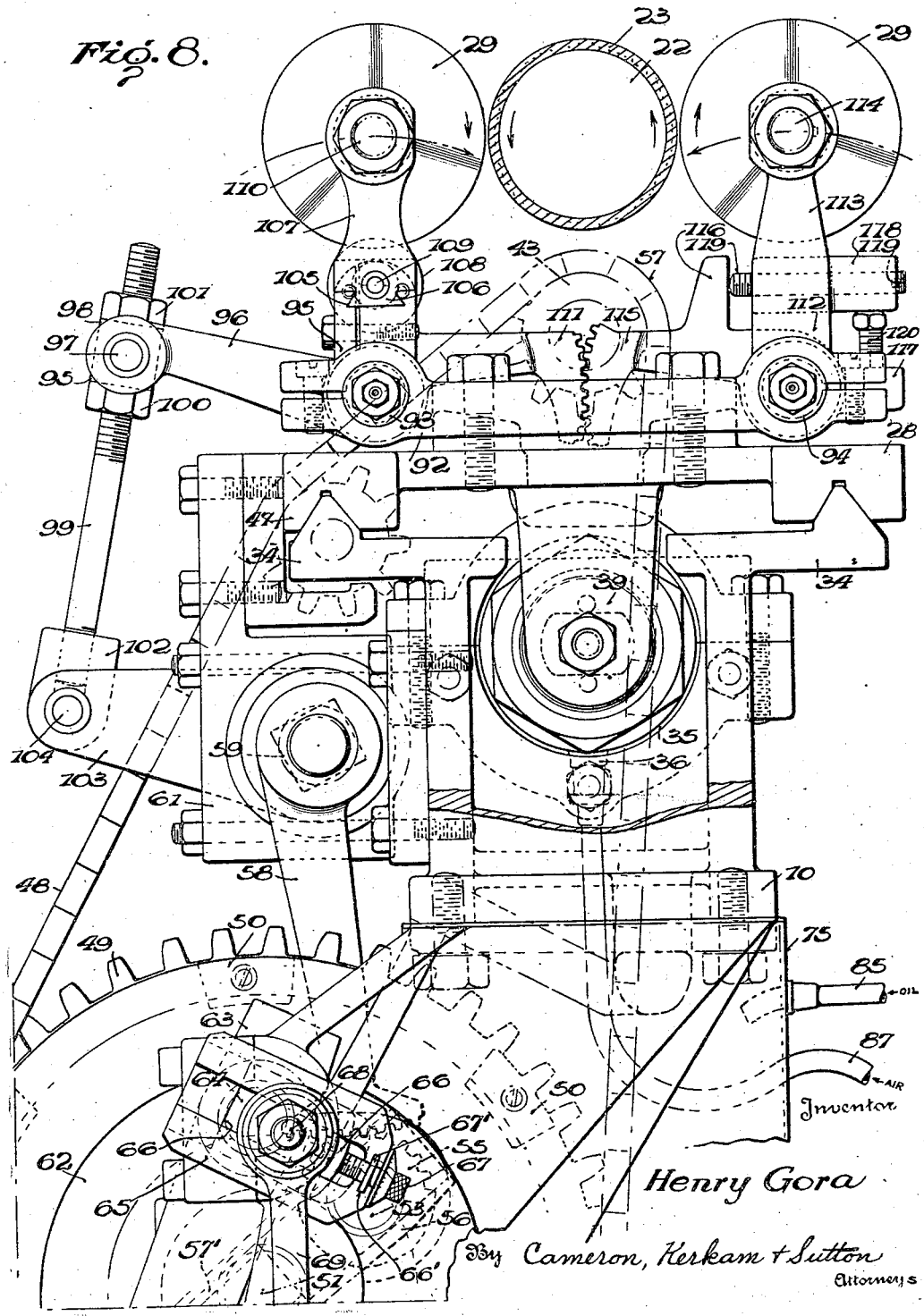
Fig. 8 is an enlarged view in cross sectional elevation of the embodiment of the invention shown in Fig. 1 as seen from the turret head with the motor, gear box, driving head, and oil reservoir removed to more clearly show the relation of the carriage and cutters to the hydraulic and pneumatic piston with particular attention to the cutter actuating mechanism.
Figure 9:
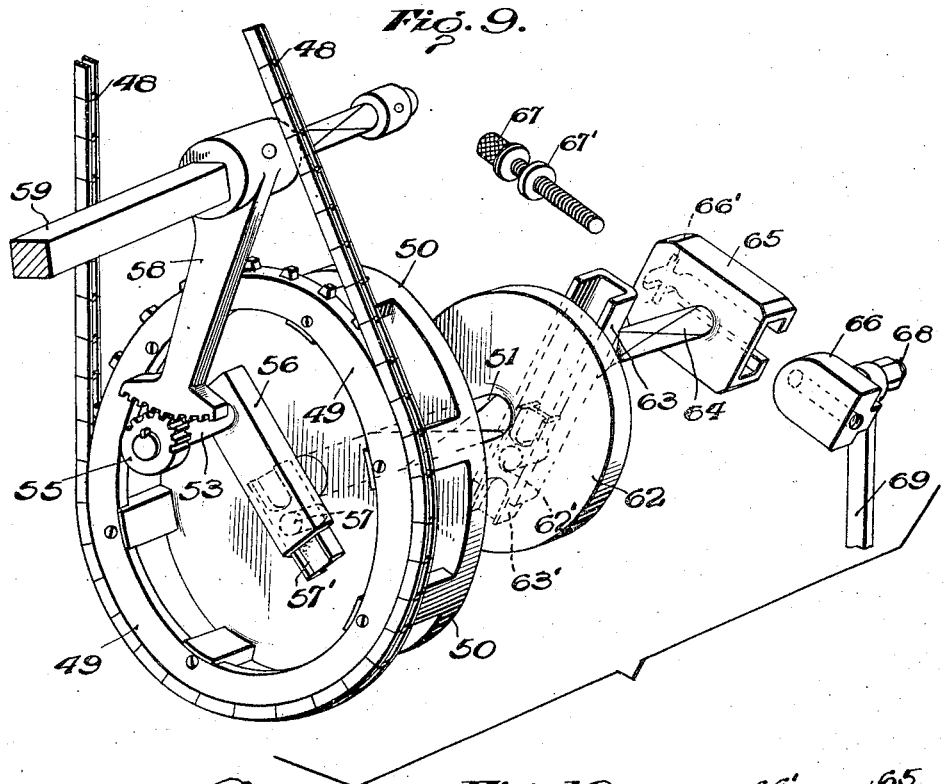
Fig. 9 is a perspective view of the pump and rocker arm actuating mechanism with the pump adjusting means shown in an exploded view as seen from the right in Fig. 1.

With particular reference to Figs. 2, 3 and 8 carriage 28 is designed to slidingly engage rails 34 of lathe bed 10 and has secured thereto bearing 61 within which square rod 59 takes a sliding bearing all as described above. Secured to carriage 28 is cutter base plate 92 which is roughly H-shaped carrying oppositely disposed bearings 93 and 94 in the extremities of the H. Carried by bearings 93 is a member 95 having two outwardly extending arms 96. Arms 96 terminate in bearings 97 within which a cross member 98 is free to rotate. Cross member 98 is apertured to receive a connecting rod 99 which is secured thereto by nuts 100 and 101 forming an adjustable connection. Connecting rod 99 terminates at its opposite end in a bearing member 102 which rotatably engages sliding arm 103 at pivot 104. Sliding arm 103 is mounted on square bar 59 at its opposite end and is designed to freely slide thereover. Member 95 taking bearing in bearings 93 of base plate 92 is triangularly grooved as at 105 (Fig. 8) to slidingly engage the triangular shaped base 106 of cutter arms 107. Base 106 can be moved within groove 105 by hand knob 108 and screw 109 to adjust the position of arms 107 and cutter 29 longitudinally with respect to the mandrel 22 and the oppositely disposed cutter 29. By proper adjustment of nuts 100 and 101 cutter 29 may be moved away from or toward mandrel 22. Cutter 29 is designed to freely rotate within bearings 110 located at the extremities of arms 107. Secured to member 95 to rock therewith is a rack arm 111 extending centrally into bed plate 92.

Carried for rotation in bearings 94 is member 112 having upwardly extending arms 113 carrying bearings 114 in which the opposite cutter 29 is free to rotate. Also mounted to rotate within bearings 94 is rack arm 115 designed to engage rack arm 111 and to move therewith. Rack arm 115 has formed thereon projections 116 and 117. Mounted on member 112 is set screw housing 118 carrying set screw 119 designed to engage projection 116 of rack arm 115. Mounted in projection 117 of rack arm 115 is set screw 120 designed to engage the under surface of set screw housing 118. By proper adjustment of set screws 119 and 120 the position of member 112 and cutter 29 can be adjusted with reference to mandrel 22 and oppositely disposed cutter 29.

With reference to Figs. 5, 6 and 7, as described above, hydraulic and pneumatic cylinder 35 is carried between rails 34 of lathe bed 10 and secured thereto by a collar 36 (Figs. 3 and 4). Carried within cylinder 35 is a piston member generally indicated at 37 and secured to a piston rod 38 secured at its outer end to depending lug 39 of carriage 28 as by the nut and bolt 121. Piston rod 38 is axially bored to form a central hollow chamber 122 extending the full length of piston rod 38. Piston rod 38 is internally threaded as at 123 to receive end closure member 124 to which is secured bolt 121. End member 124 is vented as at 125. Cylinder 35 is of enlarged diameter as at 126 to receive a bearing and collar member 127 within which piston rod 38 is designed to slide. Collar member 127 has formed therein a circumferential groove 128 to form an air seal between member 127 and piston rod 38. Collar member 127 is recessed at 129 to receive air packing seal 130 and has formed therein passages 131 which open into a circumferential chamber 132 opening against air packing seal 130. Gland nut 130' screws into the end of cylinder 35 to hold collar member 127 firmly in enlargement 126 and to expand packing seal 130. The inner end of piston rod 38 is internally threaded as at 133 to receive piston member 134. Piston member 134 is centrally recessed as at 135 and has formed thereon an axially extending guide and support member 136 into which is let holes 137 communicating with passage 138 which opens into recess 135. Piston member 134 is cut away as at 139 to allow air packing seal 140 to be carried by piston member 134 in overlapping position. Passages 141 allow the air under pressure in cylinder 35 to enter cut away portion 139 and to act against the inner surface of packing seal 140. Piston member 134 has formed therein circumferential grooves 142 to form an air seal between piston member 134 and cylinder 35. Mounted upon support member 136 is disk 143 which slidingly engages the walls of cylinder 35. Also mounted on guide and support member 136 is second piston member 144 which is centrally recessed as at 145 and cut away as at 146 to carry an air packing seal 147 in overlapping position. Passages 148 are formed in second piston member 144 adjacent disk 143 and open into central recess 145. Passages 149 lead from cut away portion 146 to central recess 145. Central recess 145 opens into the interior of hollow piston rod 38 through passages 137, 138 and chamber 135.

Mounted on supporting member 136 is disk 150 slidably engaging the walls of cylinder 35 and pressing against air seal pack 147. Carried against the opposite face of disk 150 is oil seal pack 151 designed to overlap into cut away portion 152 of third piston member 153 also mounted on supporting member 136. Passages 154 in third piston member 153 open cut away portion 152 and the inner surface of oil seal pack 151 to the oil under pressure in cylinder 35. Third piston member 153 has formed therein circumferential grooves 157 to form an oil seal between piston member 153 and cylinder 35. A nut 155 and washer 156 engaging supporting member 136 act to pack piston members 134, 144, and 153 together and to expand air seal packs 140 and 147 and oil seal pack 151. Threaded to cylinder 35 as at 158 is end closure cap 82 forming an oil tight seal therewith. Opening through cap 82 is elbow 81 to which is secured conduit 78 leading from the source of oil supply. Set in cap 82 is air valve 159 of any suitable design and construction to exhaust any air brought into the cylinder 35 by the oil.

Suppose that the embodiment of the present invention above described is set up as shown in the several figures and suppose that the lathe has just completed cutting a mandrel of work. At that time carriage 28 will have been forced to the left as seen in Fig. 1 by the action of piston 37 to a position adjacent the inner end of gear box 20, and arm 32 will have contacted switch 33 to break the circuit to motor 14. When motor 14 stops, cutters 29 may or may not be in their extreme opened position, that is in their position for no cutting removed as far as possible from mandrel 22. If the cutters 29 are not in their extreme opened position mandrel 22 is rotated by hand until they assume this position in a manner to be hereafter described. When cutters 29 are in their extreme opened position the mandrel of completed work is removed from the lathe and a new mandrel placed in the lathe. To start the work it is necessary for carriage 28 to be moved from its position adjacent gear box 20 to a position adjacent tail stock 24. To this end the operator opens valve 88 to admit air under pressure to conduit 87 and to the air chamber in cylinder 35. The motion of opening valve 88 is transmitted through rod 91 and opens valve 84 in the return oil line 85. Air under pressure in the air chamber in cylinder 35 passes on the one hand into passages 131 (Fig. 5) in collar member 127 and from there into circumferential chamber 132 and cut away portion 129 where the air under pressure engages the inner surface of air packing seal 130 to press air packing seal 130 against piston rod 38, cylinder 35, and gland nut 130' to form an air tight seal around piston rod 38 and between cylinder 35 and gland nut 130'. Circumferential groove 128 also acts to form an air seal between collar member 127 and piston rod 38. The air under pressure in the air chamber of cylinder 35 on the other hand passes into passages 141 of piston member 134 and from there into cut away portion 139 where it acts upon the inner surface of air packing seal member 140 to force air packing seal member 140 against the walls of cylinder 35 to form an air tight seal therewith. Any air escaping between air packing seal member 140 and the walls of cylinder 35 must pass disk 143. Air passing disk 143 enters passages 148 and flows into passages 137 and from passages 137 is led through passage 138 to chamber 135 and to the hollow interior 122 of piston rod 38 from which it escapes through vents 125 to the outside atmosphere. Any air passing disk 143 and passages 148 passes the end of second piston member 144 and enters cut away portion 146 thereof where it comes into contact with the inner surface of air packing seal member 147 to press air packing seal member 147 against the walls of cylinder 35 to form an air tight seal therewith. Air leaking into cut away portion 146 is conducted therefrom through passages 149 to chamber 145 and from there by passages 137 and 138 to chamber 135 and to hollow interior 122 of piston rod 38 from which it escapes through vents 125. Having formed an air tight seal between piston 37 and the walls of cylinder 35 the air under pressure acts to move piston 37 to the right as seen in Figs. 1 and 5. This motion is transmitted through piston rod 38 to depending lug 39 of carriage 28 moving carriage 28 to the right toward tail stock 24. Motion of piston 37 to the right in cylinder 35 forces any oil contained in the oil chamber of cylinder 35 outward through elbow 81 and conduit 78 through which it passes until it backs up against check valve 77 (Fig. 4) The oil then flows upward through valve 84 which is open, as above described, and passing therethrough enters pipe 85 and flows into the top of tank 75. Piston 37 continues to move to the right drawing carriage 28 with it until some suitable stop such as a bumper or other suitable structure is reached or the operator shuts off the air.

When carriage 28 has reached the desired position adjacent tail stock 24 the operator closes valve 88 and shuts off the air supply. Closing valve 88 also closes valve 84 through the medium of rod 91. Valve 88 is so constructed that when valve 88 is closed exhaust port 90 is opened allowing the air in the air chamber of cylinder 35 to exhaust into the surrounding atmosphere. The carriage 28 and cutters 29 are now in position to commence work on the material carried by the mandrel. The operator then closes switch 16 to supply motor 14 with electric current (Fig. 1). Motor 14 rotates and driving through shaft 17 and flexible joint 18 rotates shaft 19 and driving head 21 and rotates mandrel 22. Rotation of shaft 19 rotates gear 40 which in turn rotates gear 41 and shaft 42. Shaft 42 driving through clutch member 44 rotates gear 43 which acting through chain 48 rotates gear 49. Rotation of gear 49 rotates rotary disk member 50. Rotary disk member 50 carries with it pin 57 which slidably engages female member 56 through slide member 57' and gives an oscillatory movement thereto. Female member 56 transfers its oscillatory movement to shaft 53 and segment gear 55. Oscillations of segment gear 55 move rocker arm 58 in an oscillatory movement which rocker arm 58 transfers to square shaft 59. Oscillations of square shaft 59 are transferred to sliding arm 103 (Figs. 2, 3 and 8) and connecting rod 99. Connecting rod 99 acts to move cross member 98 which acting through arms 96 rocks member 95 in bearings 93. Rocking motion in member 95 is transmitted to base 106 and arms 107 carrying cutter 29 and moves cutter 29 toward and away from mandrel 22. Rocking motion in member 95 is also transmitted to rack arm 111 which engaging rack arm 115 gives a similar movement to member 112 through the medium of set screws 119 and 120 and set screw base 118. Movement of member 112 is transmitted to cutter 29 by arms 113. Cutters 29 are therefore provided with equal movement either toward or away from the mandrel 22 at the same instant.

Returning now to Figs. 1, 4, 8, 9 and 10, rotation of disk member 50 rotates shaft 51 to which it is secured and which in turn rotates disk member 62 and pin 62'. Pin 62' is positioned on disk member 62 with reference to pin 57 so that the movement of the various parts of the mechanism have the properly timed relation. Rotation of disk member 62 driving through pin 62' and slide 63' oscillates female member 63 with a varying velocity. Oscillation of female member 63 oscillates shaft 64 and female member 65 (Figs. 9 and 10) within which rides male member 66. Oscillation of male member 66 moves connecting rod 69 and acts to move pump plunger 71 in reciprocating motion in cylinder 72, the variable velocity of female member 63 being so controlled as to provide a rapid down stroke of pump plunger 71 into pump cylinder 72 and a slow withdrawal therefrom. Rapid downward movement of pump plunger 71 forces oil, drawn into cylinder 72 through check valve 74' on the slow withdrawal of pump plunger 71 on the previous cycle, outward through check valve 77 as check valve 74' is closed and pipe 78 to the oil chamber of cylinder 35. Oil entering the oil chamber of cylinder 35 passes through passages 154 into cut away portions 152 of third piston member 153 and coming into contact with the inner surface of oil seal pack 151 forces oil seal pack 151 against the surface of cylinder 35 to form an oil tight seal therewith. The oil under pressure then acts to move piston 37, piston rod 38, carriage 28, and cutters 29 to the left as viewed in Fig. 1 in amount depending on the amount of oil forced from pump cylinder 72. As explained above male members 57 and 62' are properly timed so that they are so positioned with reference to each other that cutters 29 will be in their extreme outward positions away from mandrel 22 when pump plunger 71 forces oil to cylinder 35 to index carriage 28 for the next cut. On the next cycle of the mechanism another equal volume of oil is forced into cylinder 35 and moves piston 37 an equal amount and indexes carriage 28 so that cutters 29 may make a cut equal to those previously made and so on until the mandrel is completed and arm 32 engages switch 33 to stop motor 14.

As was above described an adjustment is provided whereby the gauge of the thickness of the cut made by cutters 29 may be varied as desired. To this end male and female members 66 and 65 are provided with a set screw 67 which by rotation varies the position of the male member 66 with reference to the female member 65 through the medium of collar 67' and slot 66'. Sliding of the male member 66 within female member 65 also changes the relative positions of pivot 68 and the center of shaft 63 which changes the amount connecting rod 69 and piston plunger 71 are moved thereby varying the amount of oil pumped on each stroke of plunger 71 to cylinder 35 and varying the amount of movement of piston 37, carriage 28, and cutters 29. The further pivot 68 is removed from the center of shaft 64 the larger the stroke of connecting rod 69 and pump plunger 71 and the more oil forced into cylinder 35 and the larger the movement of piston 37 and carriage 28 with a consequent thicker cut made by the cutters 29.

Gear 43 and clutch member 44 actuated by lever 45 play a part in the conditioning of cutters 29. By use cutters 29 are dulled and the efficiency of the machine diminished and the nicety of the cut reduced. When this occurs clutch member 44 is disengaged by the operator from gear 43 at an appropriate time in the cycle of the mechanism so that cutters 29 are still in the cut and are being rotated by mandrel 22 or the operator may disengage clutch member 44 at any time in the cycle of operation and by manual rotation of mandrel 22 move cutters 29 into engagement with the material 23 being cut. Disengaging of clutch member 44 stops any further longitudinal movement of cutters 29 with relation to mandrel 22 and stops the action of pump plunger 71 and intermittent motion of piston 37 so that carriage 28 remains in place and cutters 29 rotate under the action of the material on mandrel 22. The operator may then apply a stone or other sharpening means to cutters 29. When cutters 29 are reconditioned clutch member 44 may be engaged with gear 43 and the cycle of the machine recommenced at the point where it was interrupted.

While the embodiment of the present invention above described is designed to normally make two cuts for each cycle of operation, it may be desired to make only one cut for each cycle of the mechanism. Adjustment is then made through the above described cutter adjusting mechanisms to move either of cutters 29 as desired out of cutting engagement with the material 23 on mandrel 22 so that only one cutter 29 will cut and the stroke of piston 71 is adjusted through set screw 67 to pump half the normal volume of oil to cylinder 35 to give half the normal movement to carriage 28 for each cycle of the mechanism.

From the above it will be now apparent that the present invention provides a novel hydraulic indexing means for carriages of lathes which also provides a novel pneumatic means for moving the carriage to its position for the initial cut and which has a novel means for varying the index position by varying the volumes of fluid supplied to the hydraulic means. It is also apparent that the present invention provides a novel hydraulic means for indexing the carriage of a lathe which is operated in timed relation with the movements of the cutters of the lathe as well as provides a novel pneumatic means for moving the carriage of the lathe to its position for initial cut both of which are controlled by a single manual control and operate in a single cylinder without leakage of the one medium into the other, the hydraulic medium being returned to a reservoir after use and the air of the pneumatic means being exhausted from the system after use.

To those skilled in the art it will now be apparent that changes may be made in the above described embodiment of the present invention without departing from the inventive concept thereof and reference should therefore be had to the appended claims to determine the scope of the present invention.

What is claimed is:

1. In a hydraulic indexing means for lathes having a lathe bed and a carriage slidably mounted thereon, a piston, a cylinder for said piston mounted on said lathe bed, means connecting said piston and said carriage, and hydraulic means supplying fluid to said piston in said cylinder to move said piston and said carriage in intermittent motion in equal increments.

2. In a hydraulic indexing means for lathes having a lathe bed and a carriage slidably mounted thereon, a piston, a cylinder for said piston mounted on said lathe bed, means connecting said piston and said carriage, hydraulic means supplying fluid to said piston in said cylinder to move said piston and said carriage in intermittent motion, and pneumatic means supplying air to said piston in said cylinder to return said piston after said hydraulic means have completed moving said piston and said carriage.

3. In a hydraulic indexing means for lathes having a lathe bed and a carriage slidably mounted thereon, a piston, a cylinder for said piston mounted on said lathe bed, means connecting said piston and said carriage, and hydraulic means supplying equal volumes of fluid to said piston in said cylinder to move said piston and said carriage intermittently in equal increments.

4. In a hydraulic indexing means for lathes having a lathe bed and a carriage slidably mounted thereon, a piston, a cylinder for said piston mounted on said lathe bed, means connecting said piston and said carriage, hydraulic means supplying equal volumes of fluid to said piston in said cylinder to move said piston and said carriage in spaced intermittent motion of equal increments, and pneumatic means supplying air to said piston in said cylinder to return said piston and said carriage after said hydraulic means have completed moving said piston and said carriage.

5. In an indexing mechanism of the class described having a lathe bed, a carriage slidably mounted on said lathe bed and cutters mounted for movement on said carriage, hydraulic means for moving said carriage in intermittent motion of equal increments in timed relation with the movement of said cutters including a cylinder mounted on said lathe bed, a piston mounted in said cylinder, means connecting said piston and said carriage, and pump means supplying equal volumes of fluid to said piston in said cylinder at intervals timed to the movement of said cutters.

6. In an indexing mechanism of the class described having a lathe bed, a carriage slidably mounted on said lathe bed and cutters mounted for movement on said carriage, hydraulic means for moving said carriage in intermittent motion of equal increments including a cylinder mounted on said lathe bed, a piston mounted in said cylinder, means connecting said piston and said carriage, pump means supplying equal volumes of fluid to said piston in said cylinder at intervals timed to the movement of said cutters, and pneumatic means for supplying air to said piston in said cylinder to return said piston and said carriage after said hydraulic means have completed movement of said piston and said carriage.

7. In an indexing mechanism of the class described having a lathe bed, a carriage slidably mounted on said lathe bed and cutters mounted for movement on said carriage, hydraulic means for moving said carriage in intermittent motion of equal increments including a cylinder mounted on said lathe bed, a piston mounted in said cylinder, means connecting said piston and said carriage, a pump supplying equal volumes of fluid to said piston in said cylinder at intervals timed to the movement of said cutters, and means for adjusting the volume of fluid delivered by said pump to said cylinder whereby the size of the equal increments of movement of said carriage may be regulated.

8. In an indexing mechanism of the class described having a lathe bed, a carriage slidably mounted on said lathe bed and cutters mounted for movement on said carriage, hydraulic means for moving said piston and said carriage in intermittent motion of equal increments including a cylinder mounted on said lathe bed, a piston mounted in said cylinder, means connecting said piston and said carriage, a pump supplying equal volumes of fluid to said piston in said cylinder at intervals timed to the movement of said cutters, means for adjusting the volume of fluid delivered by said pump to said cylinder to control the size of the equal increments of movement of said carriage, and pneumatic means for supplying air to said piston in said cylinder to return said carriage after movement by said hydraulic means.

9. In an indexing mechanism of the class described having a lathe bed, a carriage slidably mounted on said lathe bed and cutters mounted for movement on said carriage, hydraulic means for moving said piston and said carriage in intermittent motion of equal increments including a cylinder mounted on said lathe bed, a piston mounted in said cylinder, means connecting said piston and said carriage, a pump supplying equal volumes of fluid to said piston in said cylinder at intervals timed to the movement of said cutters, and means for adjusting the length of the stroke of said pump to adjust the volume of fluid supplied by said pump to said piston to control the size of the equal increments of movement of said carriage.

10. In an indexing mechanism of the class described having a lathe bed, a carriage slidably mounted on said lathe bed and cutters mounted for movement on said carriage, hydraulic means for moving said piston and said carriage in intermittent motion of equal increments including a cylinder mounted on said lathe bed, a piston mounted in said cylinder, means connecting said piston and said carriage, a pump supplying equal volumes of fluid to said piston in said cylinder at intervals timed to the movement of said cutters, means for adjusting the length of stroke of said pump to adjust the volume of fluid supplied by said pump to said piston to control the size of the equal increments of movement of said carriage, and pneumatic means for supplying air to said piston in said cylinder to return said carriage after movement of said carriage by said hydraulic means.

11. In a lathe having a lathe bed, a carriage slidably mounted on said lathe bed, and moving cutters mounted on said carriage, hydraulic means for moving said carriage and said cutters in intermittent movement of equal increments including a cylinder, a piston in said cylinder connected to said carriage and means supplying equal volumes of fluid to said piston at spaced intervals timed to the movement of said cutters.

12. In a lathe having a lathe bed, a carriage slidably mounted on said lathe bed, and moving cutters mounted on said carriage, hydraulic means for moving said carriage and said cutters in intermittent movement of equal increments including a cylinder and piston operatively engaging said carriage, means supplying equal volumes of fluid to said piston at intervals timed to the movement of said cutters, and pneumatic means supplying air to said piston to return said carriage after movement by said hydraulic means.

13. In a lathe having a lathe bed, a head stock, a tail stock, a motor driving said head stock, a carriage slidably engaging said lathe bed and rocking cutters mounted on said carriage and rocked by said motor, hydraulic means for moving said carriage and said cutters in intermittent movement of equal increments including a piston connected to said carriage and means driven by said motor supplying equal volumes of fluid to said piston at intervals timed to the movement of said cutters.

14. In a lathe having a lathe bed, a head stock, a tail stock, a motor driving said head stock, a carriage slidably engaging said lathe bed and rocking cutters mounted on said carriage and rocked by said motor, hydraulic means for moving said carriage and said cutters in intermittent movement of equal increments including a piston connected to said carriage, means driven by said motor supplying equal volumes of fluid to said piston at intervals timed to the movement of said cutters, and pneumatic means supplying air to said piston to return said carriage and cutters after movement by said hydraulic means.

15. In a hydraulic mechanism for moving the carriage and cutters of a jar ring lathe in intermittent movement of equal increments including a lathe bed, a head and tail stock mounted on said bed, a motor driving said head stock, a carriage slidably engaging said bed, and rocking cutters mounted for rocking movement in said carriage and rocked by said motor, a piston driving said carriage, and a pump driven by said motor supplying equal volumes of fluid to said piston at intervals timed to the movement of said cutters.

16. In a hydraulic mechanism for moving the carriage and cutters of a jar ring lathe in intermittent movement of equal increments including a lathe bed, a head and a tail stock mounted on said bed, a motor driving said head stock, a carriage slidably engaging said bed, and rocking cutters mounted for rocking movement in said carriage and rocked by said motor, a piston driving said carriage, a pump driven by said motor supplying equal volumes of fluid to said piston at intervals timed to the movement of said cutters, and pneumatic means supplying air to said piston to return said piston and carriage after completion of movement by said hydraulic means.

17. In a hydraulic mechanism for moving the carriage and cutters of a jar ring lathe in intermittent movement of equal increments including a lathe bed, a head and a tail stock mounted on said bed, a motor driving said head stock, a carriage slidably engaging said bed, and rocking cutters mounted for rocking movement in said carriage and rocked by said motor, a piston driving said carriage and a pump of adjustable length of stroke driven by said motor supplying equal volumes of fluid adjustable in size by adjustment of the length of stroke to said piston at intervals timed to the movement of said cutters.

18. In a hydraulic mechanism for moving the carriage and cutters of a jar ring lathe in intermittent movement of equal increments including a lathe bed, a head and a tail stock mounted on said bed, a motor driving said head stock, a carriage slidably engaging said bed, and rocking cutters mounted for rocking movement in said carriage and rocked by said motor, a piston driving said carriage, a pump of adjustable length of stroke driven by said motor supplying equal and adjustable volumes of fluid to said piston at intervals timed to the movement of said cutters, and pneumatic means supplying air to said piston to return said piston and carriage after completion of movement by said hydraulic means.

19. In a hydraulic and pneumatic piston for moving the carriage of a jar ring lathe in intermittent movement of equal increments, a cylinder, a piston in said cylinder, a hollow piston rod connected to said piston and closed at its other end by a vented closure secured to said carriage, a gland nut surrounding said piston rod and closing one end of said cylinder, an air seal pack adjacent the inner face of said gland nut and extending in part down said piston rod, a sleeve member surrounding said piston rod and overlying said portion of said air seal pack on said piston rod and abutting a shoulder in said cylinder, passages in said sleeve member opening adjacent said air seal pack and opening into said cylinder, an air inlet and exhaust adjacent the inner end of said sleeve member, said piston comprising a centrally chambered piston member secured to said piston rod, a guide and support member mounted on said chambered piston member extending axially in said cylinder, said guide member being centrally bored a portion of its length and opening into said chambered piston member, a second air seal pack mounted on said guide member and overlapping said chambered piston member in contact with the walls of said cylinder, passages in said chambered piston member opening adjacent said second air seal pack and opening into said cylinder, a plate mounted on said guide member adjacent said second air seal pack and slidingly engaging said cylinder, a second chambered piston member mounted on said guide member adjacent said plate, passages in said second chambered piston member adjacent said plate and extending from adjacent said cylinder to the chamber of said second chambered piston member, a third air seal pack mounted on said guide member and overlapping said second piston member in contact with said cylinder, passages in said second piston member opening adjacent said air seal pack and opening into the chamber of said second chambered piston member, passages in said guide member opening into the chamber of said second piston member and opening into the centrally bored portion of said guide member, a second plate mounted on said guide member adjacent said third air seal pack and slidingly engaging said cylinder, an oil seal pack mounted on said guide member adjacent said second plate, a third piston member mounted on said guide member recessed to receive an overlapped portion of said oil seal pack in contact with the cylinder, passages in said third piston member opening adjacent said oil seal pack and opening into said cylinder, a cover closing the opposite end of said cylinder, and an oil inlet and exhaust mounted in said cover.

20. In a lathe having a lathe bed, a carriage slidably mounted on said lathe bed, and moving cutters mounted on said carriage, hydraulic means for moving said carriage and said cutters in intermittent movement of equal increments including a cylinder and piston operatively engaging said carriage, means supplying equal volumes of fluid to said piston at intervals timed to the movement of said cutters, pneumatic means supplying air to said piston to return said carriage after movement by said hydraulic means, and a control means common to said hydraulic and said pneumatic means allowing air to exhaust from said cylinder when said piston is moved by said hydraulic means and allowing fluid to exhaust from said cylinder when said piston is moved by said pneumatic means.

HENRY GORA.